US012678884B1

(12) United States Patent (10) Patent No.: US 12,678,884 B1

McClure (45) Date of Patent: Jul. 14, 2026

(54) MALE ADAPTOR FOR TUNGSTEN INERT GAS WELDING

(71) Applicant: Jacob McClure, Las Vegas, NV (US)

(72) Inventor: Jacob McClure, Las Vegas, NV (US)

( * ) Notice: Subject to any disclaimer, the term of this patent is extended or adjusted under 35 U.S.C. 154(b) by 534 days.

(21) Appl. No.: 18/238,937

(22) Filed: Aug. 28, 2023

(51) Int. Cl.
B23K 9/32 (2006.01)

(52) U.S. Cl.
CPC .................................... B23K 9/325 (2013.01)

(58) Field of Classification Search
CPC ................................ B23K 9/325; B23K 9/323
See application file for complete search history.

(56) References Cited

U.S. PATENT DOCUMENTS

| 5,007,664 A * | 4/1991 | Mann ...................... B23K 9/325 |
| | | 285/423 |
| 2006/0226136 A1* | 10/2006 | Zamuner ................. B08B 15/04 |
| | | 219/137.41 |

| 2007/0164000 A1* | 7/2007 | Uttrachi ................. B23K 9/325 |
| | | 219/74 |
| 2019/0151978 A1* | 5/2019 | Ishikawa ................. B23K 9/28 |
| 2020/0376597 A1* | 12/2020 | Hoeger ................. B23K 9/291 |
| 2021/0205865 A1* | 7/2021 | Binzel .................... B23K 9/295 |
| 2022/0049909 A1* | 2/2022 | Hicks, II ................. F28F 9/185 |

* cited by examiner

*Primary Examiner* — Phutthiwat Wongwian
*Assistant Examiner* — Jacek Lisowski
(74) *Attorney, Agent, or Firm* — Plager Schack LLP; Mark H. Plager; Kara K. Verryt

(57) ABSTRACT

An adaptor for a tungsten inert gas (TIG) welding gas block may include an adaptor body having a first end and a second end, wherein the first end includes a pair of parallel members separated by a receiving slot; the second end comprises a male twist lock post; the first end is configured to securely engage with the TIG gas block; and the second end is configured to engage with a welding lead.

7 Claims, 3 Drawing Sheets

MALE ADAPTOR FOR TUNGSTEN INERT GAS WELDING

BACKGROUND

The embodiments described herein relate generally to welding accessories and, more particularly, to a male adaptor for tungsten inert gas (TIG) welding.

During TIG welding, electrode holders are frequently damaged due to their exposure to the harsh industrial work environment. There are no existing devices that are designed to address this issue.

Therefore, what is needed is an adaptor designed to securely attach to a TIG welding block to provide a secure connection for the electrode holder, reducing the risk of injury to a person and/or damage to equipment.

SUMMARY

Some embodiments of the present disclosure include an adaptor for a tungsten inert gas (TIG) welding gas block to operatively secure the TIG welding torch to the welding lead. The adaptor may include an adaptor body having a first end and a second end, wherein the first end includes a pair of parallel members separated by a receiving slot; the second end comprises a male twist lock post; the first end is configured to securely engage with the TIG gas block; and the second end is configured to engage with a welding lead.

BRIEF DESCRIPTION OF THE FIGURES

The detailed description of some embodiments of the invention is made below with reference to the accompanying figures, wherein like numerals represent corresponding parts of the figures.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a tungsten inert gas (TIG) welding male gas block adaptor and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements, and the following examples are presented as illustrative examples only.

Figure 1:
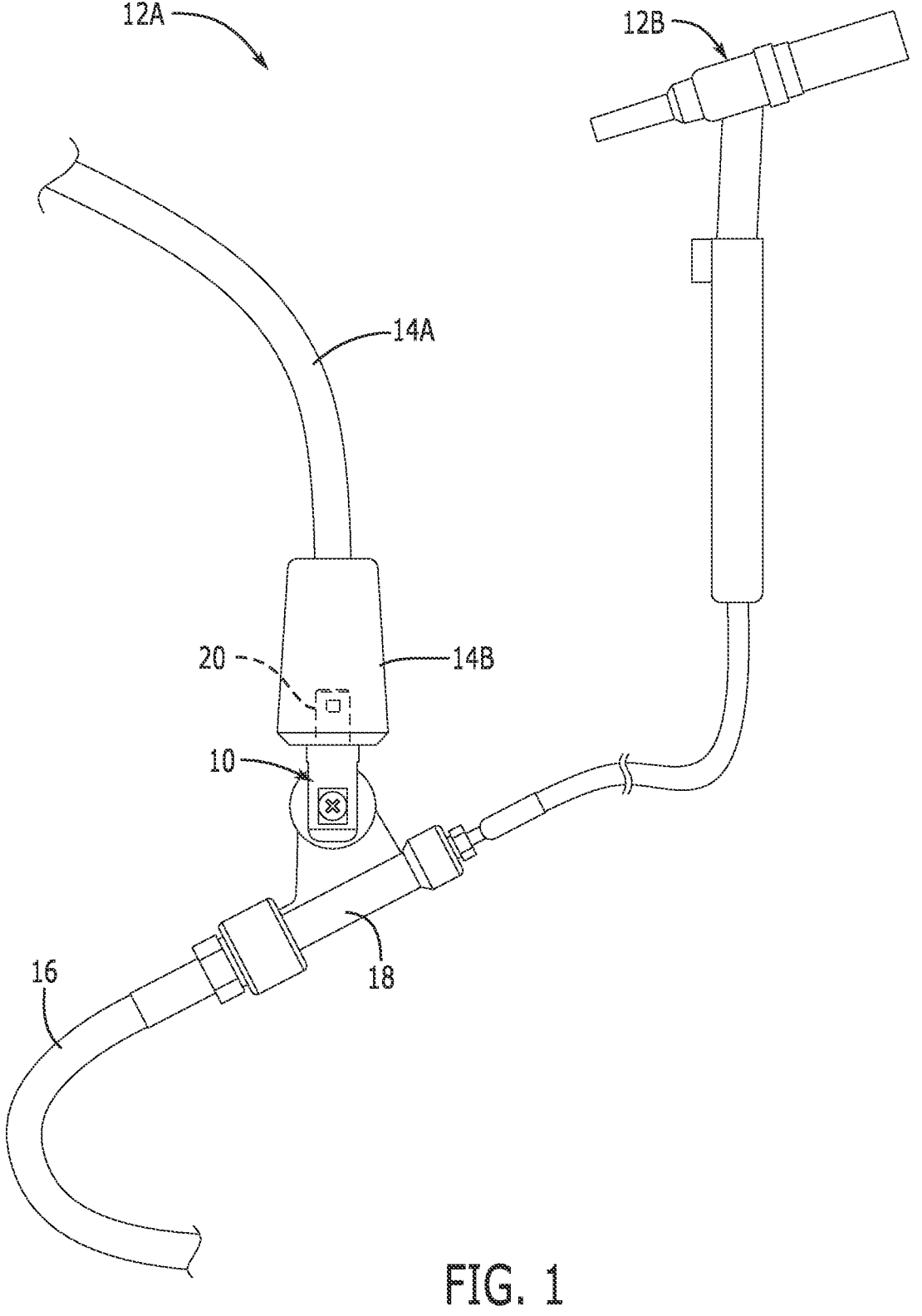
FIG. 1 is a side elevation view of one embodiment of the present disclosure, shown in use.

By way of example, and referring to FIGS. 1-5, some embodiments of the present disclosure include an adaptor 10 for a tungsten inert gas (TIG) welding gas block 18, the adaptor 10 comprising an adaptor body having a first end and a second end, wherein the first end is configured to securely engage with the TIG gas block 18 and the second end is configured to securely engage with a welding lead 14A. More specifically, and as shown in FIG. 1, the adaptor 10 may be used in a TIG welding set up 12A comprising a gas supply hose 16 attached to a gas block 18, which is also operatively connected to the TIG welding torch 12B. The adaptor 10 may be securely attached to both the gas block 18 and the welding lead 14A.

Figures 2, 3:
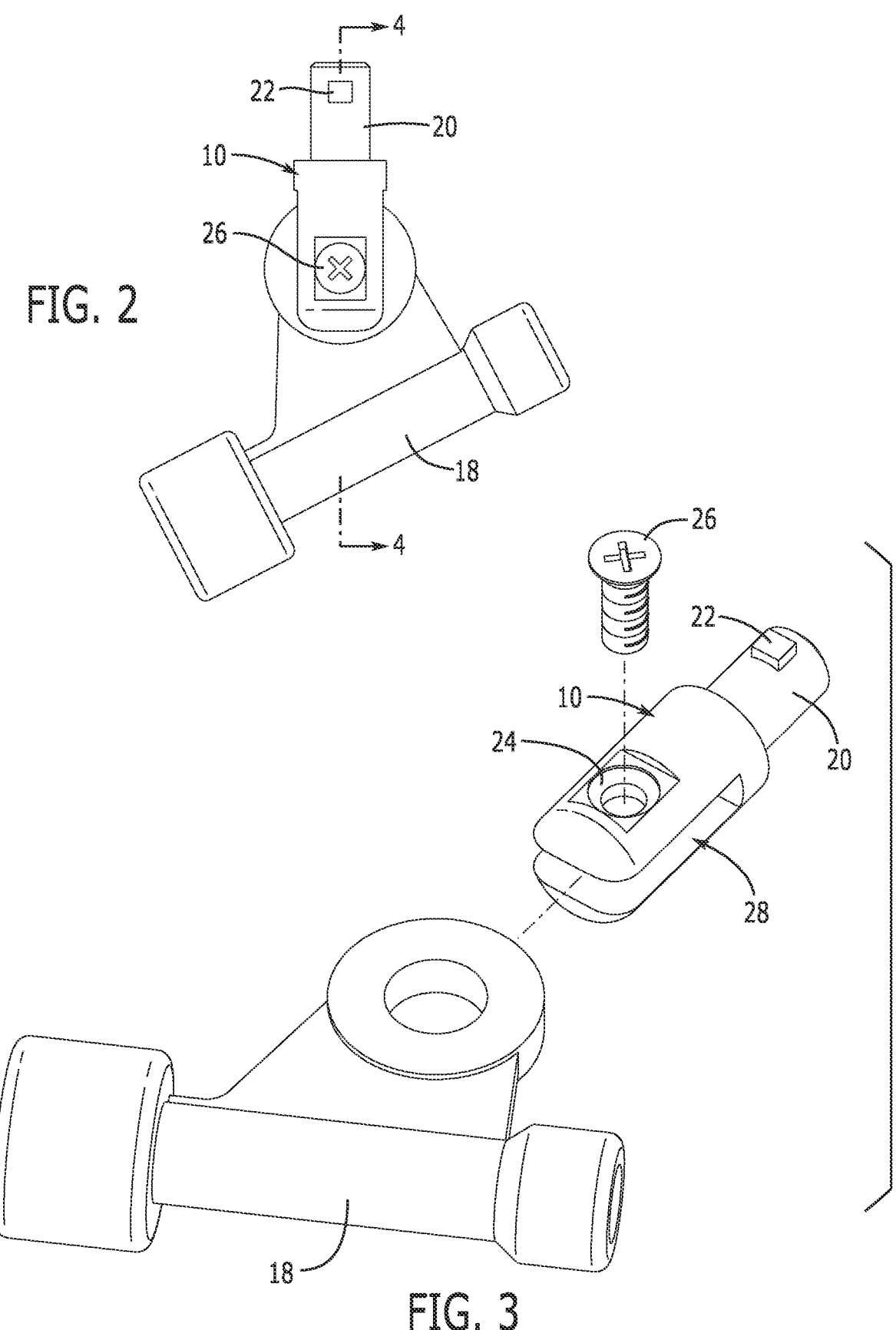
FIG. 2 is an enlarged side elevation view of one embodiment of the present disclosure.
FIG. 3 is an exploded perspective view of one embodiment of the present disclosure.

As shown in FIGS. 2 and 3, the gas block 18 may comprise a block body with an inlet 18A and an outlet 18B, a channel extending through the block body between the inlet 18A and the outlet 18B, and a block tab 18C extending outward from a side of the block body. The block tab 18C may have a block orifice 18D extending therethrough.

Figure 4:
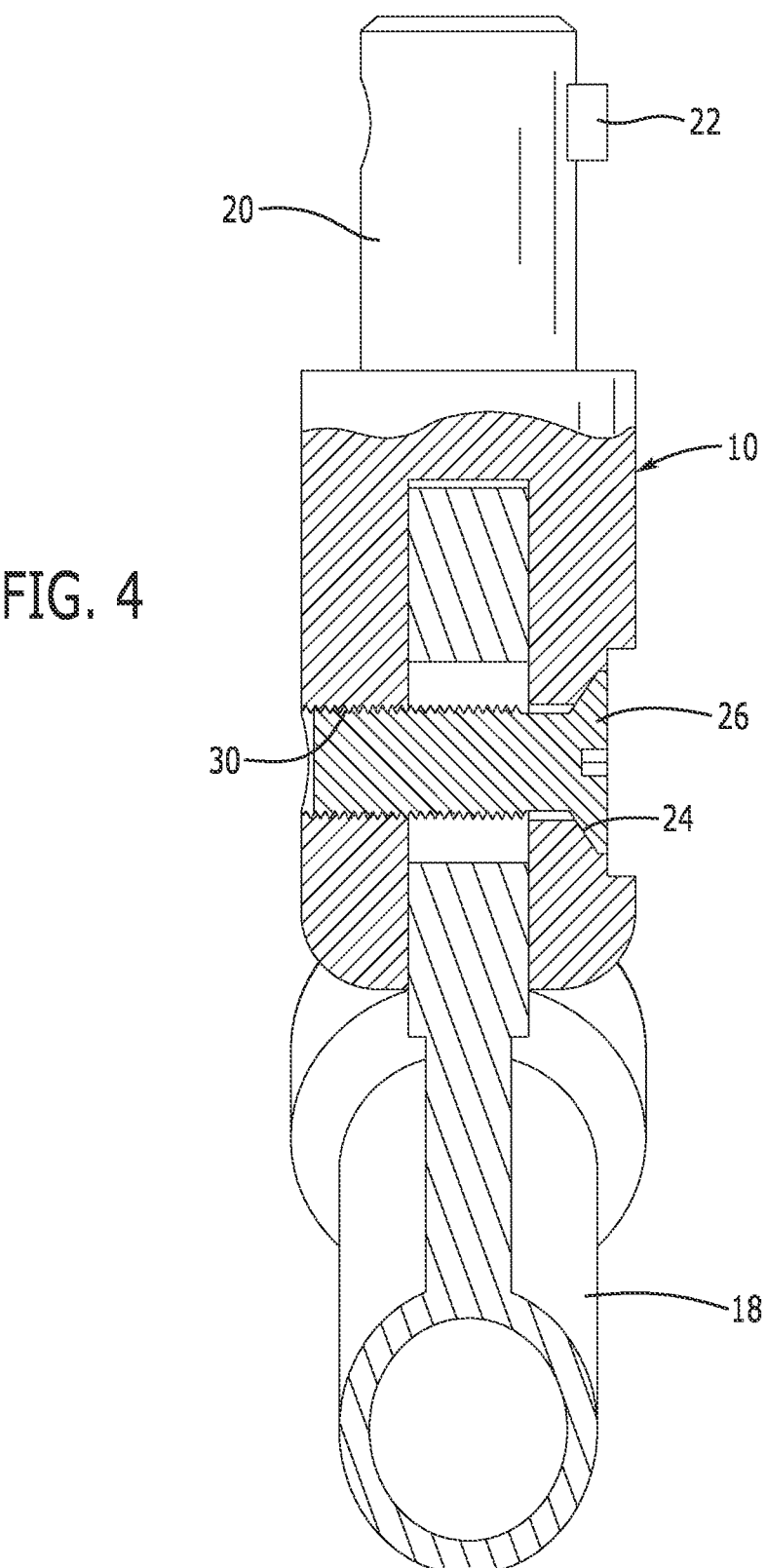
FIG. 4 is a cross-sectional view of one embodiment of the present disclosure, taken along line 4-4 in FIG. 2.

As mentioned above, a first end of the adaptor 10 may be configured to securely attach to the gas block 18. More specifically, the first end of the adaptor 10 may have a receiving slot 28 extending therethrough, wherein the receiving slot 28 is sized to accommodate placement of the block tab 18C therein. As shown in FIG. 3, the receiving slot 28 may split the first end of the adaptor 10 into a pair of parallel end members. The first end of the adaptor 10 may also comprise a fastener orifice 24 extending through each of the parallel end members, wherein the fastener orifice 24 is positioned to align, such as concentrically align, with the block orifice 18D. In embodiments, the fastener orifice 24 may include a counter sunk rim surrounding the fastener orifice 24. As shown in FIG. 4, the fastener orifice 24 may include threads 30 on inner walls thereof, wherein the threads 30 are configured to engage with threads on a fastener, such as a screw 26. In a particular embodiment, the threads 30 may only be on the end member opposite the counter sunk rim. Only including threads 30 on one end member may provide for adequate tension to ensure that the adaptor 10 is securely attached to the gas block 18.

As shown in the Figures, the second end of the adaptor 10 may be configured to engage with an end of a welding lead 14A. More particularly, as shown in FIG. 1, the second end of the adaptor 10 may comprise a male twist lock post 20 configured to securely engage with a female end 14B of the welding lead 14A by being sized to be inserted into the female end 14B of the welding lead 14B. As shown in FIGS. 3 and 4, the male twist lock post 20 may comprise a substantially cylindrical shaped unit with a locking tab 22 extending from a side surface thereof. The locking tab 22 may be configured to securely engage with the interior of the female end 14B.

The adaptor 10 of the present disclosure may have any dimensions suitable for engaging with a gas block 18 and the female end 14B of a welding lead 14A. In a particular embodiment, the first end of the adaptor 10 may have a substantially cylindrical outer shape with a rounded distal end, wherein a diameter of the first end may be, for example, about 1 inch and a length of the first end may be, for example, about 1 3/16 inch. The retaining slot 28 in the first end may have a height (i.e., the distance from a first of the parallel members to a second of the parallel members) of about 7/32 inch and a depth (i.e., distance from the distal end to an inner wall) of about 1 inch. As shown in the Figures, the male twist lock post 20 may have a diameter smaller than that of the first end.

To use the adaptor 10 of the present disclosure, a gas block 18 with an attached gas supply hose 16 and an attached TIG welding torch 12B may be provided. The block tab 18C may be inserted into the receiving slot 28, such that an orifice 18D in the block tab 18C aligns with the fastener orifice 24. A fastener, such as a screw 26, may be inserted into the orifice 24 and through the block tab 18C. The distal end of the screw 26 may engage with the threads on the bottom member of the pair of parallel members on the first end of the adaptor 10. Additionally or alternatively, the distal end of the screw 26 may engage with a nut. In some embodiments, washers may be positioned on one or both sides of the block tab 18C between the block tab 18C and the parallel members. Following these steps may secure the first end of the adaptor 10 to the gas block 18. The male twist lock post 20 may be inserted into the female end 14B of the welding lead 14A. Connecting the adaptor 10 to both the welding lead 14A and the gas block 18 may thus operatively attached the TIG welding torch 12B to the welding lead 14A, as shown in FIG. 1. The user may then perform TIG welding as normal.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

4

What is claimed is:

1. An adaptor for a tungsten inert gas (TIG) welding gas block, the adaptor comprising:
   an adaptor body having a first end and a second end, wherein:
      the first end comprises a pair of parallel members separated by a receiving slot;
      the second end comprises a male twist lock post;
      the first end is configured to securely engage with the TIG gas block; and
      the second end is configured to engage with a welding lead.

2. The adaptor of claim 1, wherein the TIG gas block comprises a block tab extending therefrom and the receiving slot is sized to accommodate insertion of the block tab therein.

3. The adaptor of claim 1, further comprising a fastener orifice extending through each of the pair of parallel members.

4. The adapter of claim 3, wherein at least one end of the fastener orifice comprises a countersunk rim surrounding the fastener orifice.

5. The adapter of claim 3, wherein the fastener orifice on one member of the pair of parallel members is threaded.

6. The adapter of claim 1, wherein the male twist lock post comprises a cylindrical unit with a lock tab extending outward from a side surface thereof.

7. The adapter of claim 6, wherein the male twist lock post is sized to be accommodated within a female end on the welding lead.

\* \* \* \* \*